United States Patent
Murray, Jr.

[11] Patent Number: 5,777,810
[45] Date of Patent: Jul. 7, 1998

[54] REINFORCED SIGNAL MIRROR

[76] Inventor: Malcolm G. Murray, Jr., 220 E. Texas Ave., Baytown, Tex. 77520-5257

[21] Appl. No.: 745,521

[22] Filed: Nov. 12, 1996

Related U.S. Application Data

[63] Continuation of Ser. No. 454,765, May 31, 1995, abandoned.

[51] Int. Cl.[6] .................... G02B 5/08; G02B 7/82; G02B 5/12
[52] U.S. Cl. .................. 359/883; 359/515; 359/514; 359/513; 359/838; 359/516; 359/517; 116/202; 116/276; 116/20
[58] Field of Search ................ 359/883, 515, 359/514, 513, 838, 516, 517; 116/202, 276, 20

[56] References Cited

U.S. PATENT DOCUMENTS

| | | | |
|---|---|---|---|
| 2,395,605 | 2/1946 | Young | 116/20 |
| 2,467,165 | 4/1949 | Stimson | 116/20 |
| 2,504,982 | 4/1950 | Hunter | 116/20 |
| 2,557,108 | 6/1951 | Hunter | 116/20 |
| 2,589,618 | 3/1952 | Learned | 116/20 |
| 2,594,310 | 4/1952 | Hunter | 116/20 |
| 2,698,594 | 1/1955 | Morgan | 116/20 |
| 2,698,595 | 1/1955 | Morgan | 116/20 |
| 2,698,596 | 1/1955 | Morgan | 116/20 |
| 3,164,124 | 1/1965 | Ehrsam | 116/20 |
| 3,335,693 | 8/1967 | Murray, Jr. | 116/20 |
| 4,395,828 | 8/1983 | Juhas | 33/272 |
| 4,794,581 | 12/1988 | Andresen | 369/45 |
| 5,327,737 | 7/1994 | Eggemar | 62/66 |

*Primary Examiner*—Thong Nguyen
*Assistant Examiner*—Mohammad Y. Sikder
*Attorney, Agent, or Firm*—King and Schickli

[57] ABSTRACT

A signal mirror assembly has a laminated sandwich construction and includes a transparent center sighting disk. The disk interconnects a relatively thick plastic front sheet with a thin rear plastic sheet to provide enhanced structural integrity and to eliminate potential interference due to condensation. A retrodirective wire screen provides enhanced viewfinding capabilities and is centered within an opening in the adhesive sheet that bonds the plastic sheets together. Reinforcing rods along the horizontal sides of the mirror are rigidly anchored along a center portion and resiliently connected at opposite ends to limit warping over time while allowing for correction of focus by bending, if necessary. Optionally, the mirror may include foam pads for buoyancy.

16 Claims, 2 Drawing Sheets

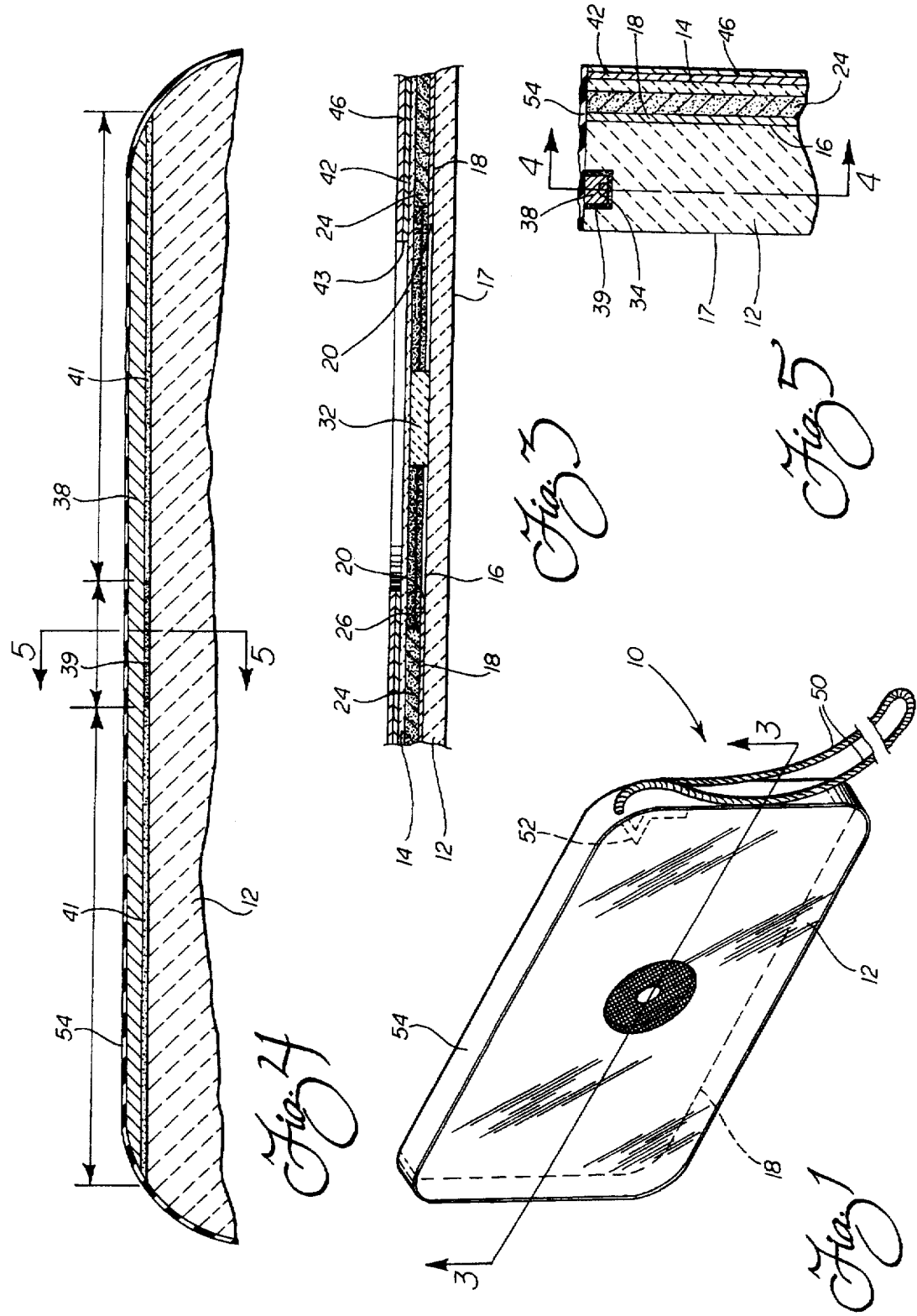

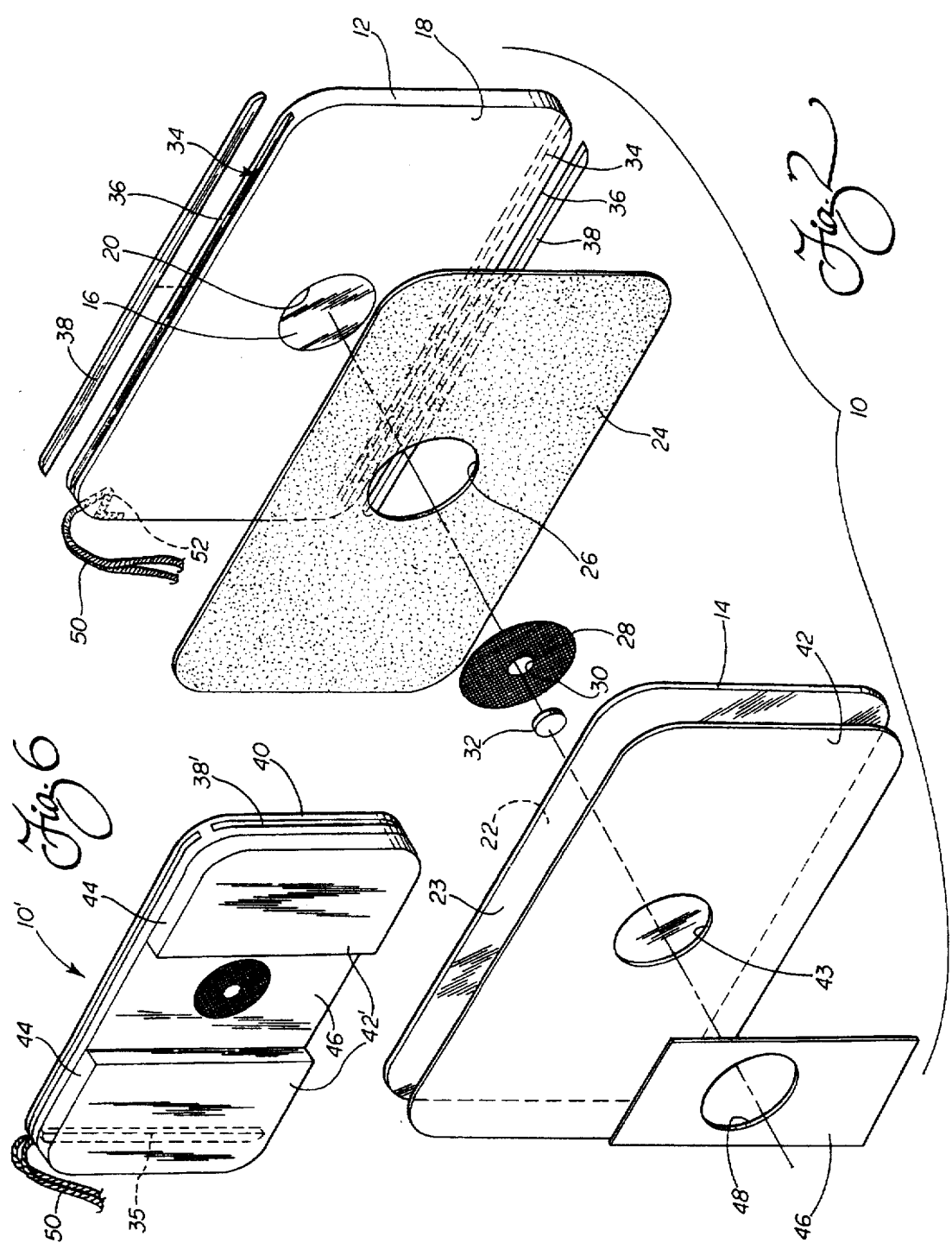

REINFORCED SIGNAL MIRROR

This is a continuation of application Ser. No. 08/454,765, filed May 31, 1995, now abandoned.

TECHNICAL FIELD

The present invention relates generally to a signal mirror for reflecting sunlight and the beam of search lights to attract attention; and more particularly, to an improved reinforced signal mirror assembly having a warp-resistant construction and warp correction capability, and including a center sighting disk for improved aiming and enhanced structural integrity.

BACKGROUND OF THE INVENTION

Signal mirrors have long been a popular and effective means for summoning help from a remote location. They are small in size and thus easily carried, inexpensive and simple to operate. They continue to be standard equipment in many modern survival kits, and in ships, rafts and lifeboats.

The basic design of the signal mirror has remained relatively unchanged over the last 25 years.

Examples of typical signal mirrors include the applicant's U.S. Pat. No. 3,335,693 and the U.S. Pat. No. 2,557,108 to Hunter. Each of these patents teaches a signal mirror comprising a mirrored surface that is sandwiched between two layers of transparent material.

In the '693 patent, plastic is disclosed as the preferred material as it is break-resistant, lightweight and non-sparking. The mirrored surface is created on the inner surface of one of the layers by vacuum metalizing with aluminum and is formed without the use of any lacquer that could inhibit reflectivity. The aluminum is applied so as to leave a sighting opening in the center of the plastic layer to allow the user to properly aim the mirror and direct the reflected light at the intended target.

The '108 patent teaches the use of a fine wire mesh retrodirective screen, or retroreflector, positioned within the sighting opening to assist in aiming the mirror. Each wire of the screen supports individual spherical beads formed from a high angularity material, such as #7240 manufactured by the 3M Company. These retroreflective beads produce a round spot of reflected light that appears to the user to be on the target when the mirror is properly aimed. The screen also includes a small viewfinding hole in its center. While the user can partially view the target through the screen mesh, the viewfinding hole in the screen provides a clear sight path and allows easier initial sighting of the target.

Applicant's '693 patent teaches covering the outer surface of one of the plastic layers with night-reflective material for reflecting the light from searchlights at night. The '693 patent also discloses the concept of providing a floating signal mirror by attaching low-density, closed-cell plastic foam pads to the outer face of the same layer.

While these prior art designs have proven effective in operation and generally satisfactory, they nevertheless contain certain drawbacks and features that warrant improvement. For example, while plastic has many desirable features that make it preferable over glass, one drawback with using plastic sheets is that they easily warp. As the intensity of the reflective signal is directly proportional to the flatness of the mirror surface, a warped or deformed surface produces a weaker signal, thereby reducing signaling range. Additionally, once a plastic sheet is warped or bent, it cannot be corrected by manual "back-bending" alone. With a sheet of pure plastic, warpage can be effectively corrected only with the application of heat, manual manipulation and subsequent cooling in the-desired flat profile.

Another disadvantage with the prior art signal mirror designs lies in the construction of the mirror assembly around the central retrodirective wire screen. In the prior art designs, the wire screen is positioned in a cavity that is formed adjacent the sighting opening between the two plastic sheets. During assembly of the mirror, air is trapped in this cavity when the sheets are laminated together. If the mirror is later used in a cold environment, and the temperature of the trapped air falls below the air's dew point, moisture condensation forms within the cavity. Such condensation causes fogging that obstructs the view through the viewfinding hole and interferes with aiming the mirror at the desired target. One manufacturing precaution that helps to partially alleviate this problem is to perform the mirror assembly in a low humidity environment. However, this requires extensive environmental control equipment and still results in air being trapped in the central cavity.

This prior art mirror assembly design also necessarily requires that the two plastic sheets are laminated together only along the metalized mirrored surface surrounding the cavity/sighting opening, and not at the cavity/sighting opening in the center portion of the assembly. Without securing the two sheets together at their center point, the laminating adhesive exerts tension on the mirrored surface when the two sheets are moved in opposite directions within the same plane. Above a certain level, this tension leads to delamination and other damage or marring to the mirrored surface.

Thus, as demonstrated by the limitations of the prior art, there is a need identified for a signal mirror assembly that includes pliable reinforcing means to both protect the mirror from warpage and allow manual correction of warpage. The signal mirror should also prevent condensation from forming in the center viewfinding hole and provide for positive attachment of the two plastic sheets at the critical center portion of the assembly.

SUMMARY OF THE INVENTION

In accordance with the purposes of the present invention as described herein, a novel and improved signal mirror assembly is provided for reflecting light to a distant target. The assembly includes twin clear sheets that sandwich the reflective surface and a retrodirective wire screen. Preferably, the sheets are fabricated from plastic, such as acrylic, polycarbonate or other suitable transparent plastic that is available in sheet form. To protect the sheets from scratches and scrapes, the exposed surfaces of the sheets are coated with a clear, abrasion-resistant coating. Alternatively, the sheets can be fabricated from an inherently scratch-resistant plastic, such as allyl diglycol carbonate, more commonly known as CR-39.

The first of the twin clear sheets is vacuum metalized with aluminum on its inner face to form a second-surface mirror. This layer of reflective aluminum is applied so as to leave a clear aperture in the center of the sheet. The aperture is preferably round and defines a sighting window through which a user views the intended signaling target.

The second clear sheet has substantially the same shape as the first sheet and includes an inner face that is in laminated engagement with the aluminum-metalized face of the first sheet. Preferably, the sheets are rectangular in shape and include two horizontal sides and two vertical ends. To bond the two clear sheets together, a thin sheet of double-sided adhesive is placed between the clear sheets. The adhesive sheet includes a center circular hole with a diameter slightly larger than that of the clear aperture in the first sheet.

Within the center circular hole is a retrodirective wire mesh screen. In the preferred embodiment, the wire screen is disk shaped with a diameter substantially equal to the center circular hole in the adhesive sheet. The thickness of the wire screen is slightly less than that of the adhesive sheet, such that the screen rests substantially flush inside the adhesive sheet. The wire screen also includes a viewfinding hole in its center for easier initial sighting of the intended target.

In a novel and important aspect of the present invention, a clear plastic center sighting disk is positioned within the viewfinding hole in the wire screen and adheres to the inner faces of the first and second clear sheets. Preferably, transparent adhesive is used to bond the sighting disk to the clear sheets so as to avoid any interference with the aiming/viewing functions of the viewfinding hole. Advantageously, the sighting disk completely fills the disk-shaped cavity defined by the viewfinding hole in the wire screen. In this manner, the possibility of cloudy condensation obscuring the viewfinding hole is affirmatively eliminated, and the sighting disk ensures a clear sighting path and optimal viewfinding even in cold weather conditions.

In a further important and novel aspect of the present invention, the center sighting disk positively secures the first and second clear sheets together to provide critical reinforcement at the exact center of the mirror assembly. Advantageously, this enhanced structural integrity is provided independently of the adhesive sheet, thereby protecting against the creation of damaging tension forces that could mar or delaminate the aluminum mirrored surface.

To complete the lamination, the first and second clear sheets are pressed together and bonded to the adhesive sheet to form a sandwich construction enclosing the wire screen and sighting disk. The outer surface of the second clear sheet is covered with a sheet of night reflective material that includes a center hole aligned coaxially with the clear aperture in the first clear sheet. In an alternative embodiment, two low-density floating foam pads are attached to the outer face of the second sheet. The pads give the mirror assembly buoyancy and are particularly adapted for water-related applications. A label also made of night reflective material is applied to the outer face of the second clear sheet. The label includes a center hole aligned coaxially with the clear aperture and gives basic instructions for proper use of the mirror.

In an additional important aspect of the present invention, pliable reinforcing means are included in the first clear sheet to protect the mirror assembly from undesired warping. In the preferred embodiment, the first sheet includes a groove extending along the edge of both horizontal sides. An aluminum rod is positioned within each groove to provide reinforcement against undesired bending and warpage. Preferably, the rods are rectangular in cross-section and are made from type 3003 or similar soft-tempered aluminum.

Advantageously, in addition to preventing unintended warpage, the reinforcement rods also allow a manufacturer or user to manually "back-bend" the mirror assembly to correct any previously induced warpage. Being soft-tempered, the rods retain a portion of the back-bend correction and prevent the warpage from returning fully, as would occur if solid plastic sheets were manually back-bent. Furthermore, as the rods are positioned in grooves within the first clear sheet, the rods provide reinforcement without exerting harmful tension on the mirrored surface, and thus have no tendency to cause delamination. As an additional feature to minimize the possibility of warpage, the first clear sheet having the mirrored surface applied to its inner face is given a substantial thickness in the range of ¼"–⅛". A plastic sheet of this thickness resists warpage better than a thinner sheet of similar length and width dimensions.

To provide a convenient means for carrying and retaining the mirror, a lanyard cord loop is attached to the assembly. A hollow zig-zag passage is drilled into one corner of the first clear sheet between the inner and outer faces. The two ends of a length of lanyard cord are inserted into the passage, knotted and melted together into the plastic to secure the cord to the mirror assembly. This manner of lanyard cord attachment is superior to the more common method of drilling a hole through the entire mirror assembly from front to back, with the cord threaded through the hole and tied in a knot. This latter method allows the cord to easily become untied and, more seriously, exposes the interior mirrored surface to corrosive agents entering through the unsealed hole.

Once the lanyard cord is secured in the mirror, a synthetic rubber sealing material is applied to the entire perimeter of the mirror assembly. This sealing material further protects the interior mirrored surface from corrosion and provides smooth, slip-resistant outer edges for comfortable handling.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of this specification illustrate several aspects of the present invention, and together with the description serve to explain the principles of the invention. In the drawings:

FIG. 1 is an overall perspective view of a signal mirror assembly of the present invention showing the mirrored surface in dotted outline within the assembly.

FIG. 2 is an exploded perspective view of the signal mirror assembly showing the components coaxially aligned about their respective center apertures, and showing the reinforcing rods and matching grooves in the horizontal sides of the first clear sheet.

FIG. 3 is an enlarged cross section view of the mirror assembly taken along line 3—3 showing the wire screen, adhesive sheet and the clear sighting disk being sandwiched between the first and second clear sheets, and showing the night reflective sheet and label applied to the outer face of the second sheet.

FIG. 4 is an enlarged cross section view taken along line 4—4 illustrating the two different adhesive sealants used to secure the reinforcing rods within the grooves in the first clear sheet.

FIG. 5 is an enlarged cross section view taken along line 5—5 illustrating the sandwich construction of the mirror assembly and showing the reinforcing rod in the horizontal side groove.

FIG. 6 is an overall perspective view of an alternate embodiment of the present invention showing two flotation pads attached to the outer face of the second sheet, and showing two additional reinforcing rods within grooves along the vertical ends of the first clear sheet.

Reference will now be made in detail to the present preferred embodiment of the invention, an example of which is illustrated in the accompanying drawings.

DETAILED DESCRIPTION OF THE PREFERRED EMBODIMENT

Reference is now made to FIGS. 1 and 2 of the drawings showing the preferred embodiment of an improved reinforced signal mirror assembly according to the present invention and generally represented by the reference numeral 10. The assembly 10 is comprised of first and second clear sheets 12, 14 that are bonded together along their inner faces 16, 22 to form a sandwich construction. Preferably, the sheets 12, 14 have substantially the same rectangular shape and are fabricated from acrylic, polycarbonate or other suitable transparent plastic available in sheet form. A transparent abrasion-resistant coating (not shown) is applied to the exposed surfaces of the sheets 12, 14 to protect them from being scratched or otherwise marred. Alternatively, the sheets may be fabricated from an inherently scratch-resistant plastic, such as allyl diglycol carbonate, more commonly known as CR-39.

As best shown in FIGS. 2 and 5, the inner face 16 of the first clear sheet 12 is covered with a layer of mirror reflective material 18 to form a second-surface mirror. Preferably, the mirror reflective material 18 is aluminum that is vacuum metalized to the inner face 16. If desired, the reflective material 18 may be overcoated with paint and baked to provide a smooth and protected finish.

As illustrated in FIGS. 2 and 3, the layer of mirror reflective material 18 is applied to the inner face 16 such that a clear aperture 20 is left in the center of the first clear sheet 12. Preferably, the aperture 20 is circular and, as explained in more detail below, defines a sighting window through which the user sights and aims the mirror assembly 10 at the intended target.

With reference to FIG. 2, the signal mirror assembly 10 is constructed by laminating the layer of reflective material 18, which covers the inner face 16 of the first clear sheet 12, to the inner face 22 of the second clear sheet 14. In the preferred embodiment, a sheet of double-sided adhesive 24 is sandwiched by the first and second clear sheets 12, 14. Examples of a suitable double-sided adhesive sheet are MACmount #9632 manufactured by MACTAC, and #4432 manufactured by 3M. The adhesive sheet 24 includes a center hole 26 that is aligned coaxially with the clear aperture 20 in the first clear sheet 12. As best illustrated in the enlarged sectional view of FIG. 3, the center hole 26 in the adhesive sheet 24 preferably has a diameter slightly larger than that of the aperture 20 in the first sheet 12.

Positioned within the center hole 26 of the adhesive sheet 24 is a retrodirective wire mesh screen 28 with a diameter substantially equal to that of the hole 26. Preferably, the thickness of the wire screen 28 is equal to or less than the thickness of the adhesive sheet 24, whereby the screen rests substantially flush within the vertical plane of the adhesive sheet. Reflective glass beads (not shown) are adhesively attached to the individual wires of the screen 28. The beads reflect sunlight and produce a round white spot which is aligned by the user on a distant target to assist in aiming the mirror.

As shown in FIG. 2, the screen 28 also includes a center viewfinding hole 30. To aim the mirror assembly 10, a user looks through the viewfinding hole 30 from behind the second clear sheet 14 and aligns the round white spot of reflected light seen through the screen on the intended target. Advantageously, the viewfinding hole 30 allows easier initial sighting of the intended target by providing a clear line of sight, as opposed to the partially obstructed view available through the wire mesh of the screen 28.

In an important and novel aspect of the present invention, a clear plastic center sighting disk 32 is located within the viewfinding hole 30 of the wire screen 28. The sighting disk 32 has a diameter substantially equal to that of the viewfinding hole 30 and a thickness no greater than that of the adhesive sheet 24. The sighting disk 32 is bonded to the inner faces 16, 22 of the first and second clear sheets 12, 14, respectively. Preferably, a transparent adhesive is used, such as EPO-TEK 301 manufactured by Epoxy Technology, Inc., to avoid any impairment in viewfinding.

With this construction, the sighting disk 32 advantageously provides critical structural reinforcement at the exact center of the mirror assembly 10. This additional reinforcement counteracts potentially damaging tension forces exerted by the adhesive sheet 24 on the mirror reflective material 18. Because it adheres to the reflective material 18, the adhesive sheet 24 exerts a tension or sheer force along the reflective material layer when the adjacent first and second clear sheets 12, 14 are forced in opposite directions within the same plane. If allowed to grow too large, these tension/sheer forces can result in delamination of the reflective material 18, thereby impairing the reflectivity and signal strength of the mirror assembly 10. Advantageously, the center sighting disk 32 provides supplemental structural integrity independently of the adhesive sheet 24 that opposes any tension/sheer forces exerted on the reflective material 18.

In addition to providing supplemental reinforcement, the center sighting disk 32 affirmatively eliminates the problem of cloudy condensation forming within the viewfinding hole 30 in cold weather conditions. Without the center sighting disk 32, air is trapped in the disk-shaped cavity formed by the viewfinding hole 30. If the mirror assembly 10 is used in a cold climate, and the temperature of the trapped air drops below the air's dew point, moisture condensation can appear within the cavity causing fogging that impairs viewfinding of the intended target. Advantageously, the clear center sighting disk 32 solves this problem by displacing any trapped air and ensuring clear viewfinding in all weather conditions.

In a further important and novel aspect of the present invention, pliable reinforcing means are provided to resist warping of the mirror assembly 10 and to allow for correction of any previously induced warpage. As shown in FIG. 2, the first clear sheet 12 includes a side groove 34 extending along the edge of each horizontal side 36. In the preferred embodiment, the reinforcing means comprises a rectangular rod 38 that is secured within the side groove 34. Preferably, the rod 38 is fabricated from Type 3003 aluminum. However, within the broader aspects of the present invention, other light-weight materials having substantially soft-temper bending characteristics and different shapes and cross sections may be used.

Advantageously, the rods 38 provide positive reinforcement against undesired warpage of the signal mirror assembly 10. Additionally, by locating the rods 38 within the first clear sheet 12, the rods provide the desired reinforcement without exerting any tension or stress forces on the mirror reflective material 18. Furthermore, because they are made of a soft-temper aluminum, the rods 38 allow a manufacturer or user to "back-bend" the mirror assembly to remove any previously induced warpage. The soft-temper aluminum retains some of the "back-bend" correction and does not allow the warpage to fully spring back. In this manner, the rods 38 allow a user to easily achieve optimum surface flatness in the field. One simply reflects the sun at a shaded vertical surface and bends the mirror assembly 10 until a concentrated uniform round light spot is achieved and maintained.

In a further novel aspect of the present invention, the rods 38 are secured in the side grooves 34 by two adhesives 39, 41 having different rigidities upon curing. As shown in FIG. 4, at a mid-point portion of the first sheet 12 a semi-rigid adhesive 39 anchors the rod 38 over a small distance of approximately ½ inch. An example of a suitable semi-rigid adhesive is Evans-St. Clair #45056. Extending from each end of the mid-point portion to the opposite ends of the side groove 34, a more flexible sealant 41, such as General Electric Silicone II black, secures the rod 38 within the groove and permits a measure of expansion and contraction of the rod. In this manner, excessive stress and strain forces resulting from deformation due to temperature variations are avoided. Thus, this unique manner of securing the rods 38 within the grooves 34 serves to further protect the mirror assembly 10 from undesired warpage.

In an alternative embodiment illustrated in FIG. 6, a mirror assembly 10' includes additional rods 38' within vertical end grooves 35 that extend along the edge of each vertical end 40 of the first clear sheet 12. This additional reinforcement is advantageous for applications in which the mirror assembly 10' is subject to severe and/or constant unequal loadings that encourage rapid warpage, and in other embodiments in which the vertical ends 40 are more nearly equal in length to the horizontal sides 36.

As an additional means for minimizing unintended warpage, the first clear sheet 12 is given a relatively substantial thickness that is greater than the thickness of the second clear sheet 14. As is well known, the rigidity of a plastic sheet increases proportionally with the cube of its thickness. In the preferred embodiment, the first sheet 12 has a thickness of between ¼"–⅛" to yield the ideal combination of structural rigidity and light-weight/easy handling.

To provide for signaling at night by reflecting the light from a searchlight, a sheet of night reflective material 42 is adhesively affixed to the outer face 23 of the second clear sheet 14. At night, the surface of the night reflective sheet 42 glows in the beam of a searchlight. An example of a suitable night reflective material is SCOTCHLITE, manufactured by the 3M Company.

As shown in FIGS. 2 and 3, the night reflective sheet 42 includes a center hole 43 to allow viewfinding through the disk 32 and screen 28. As best seen in FIG. 3, the center hole 43 in the night reflective sheet 42 has a diameter that is slightly smaller than the clear aperture 20 in the first clear sheet 12. In this manner, maximum surface area is provided for the night reflective sheet 42 while still allowing for adequate viewfinding.

In the alternative signal mirror assembly 10' shown in FIG. 6, flotation pads 44 are attached to the outer face 23 of the second clear sheet 14. Preferably, the pads 44 are made from a closed-cell, low density plastic foam. To provide a flat, hard surface for bonding the night reflective material 42', a thin sheet of plastic (not shown) is affixed to the external surface of each pad 44. Night reflective material 42 is then applied over the plastic sheet. This floating signal mirror 10' is particularly useful for marine and over-water flying applications.

As shown in FIGS. 2 and 5, a label 46, also made of night reflective material, is applied in the center portion of the second clear sheet 14. The label 46 also includes a center hole 48 having a diameter slightly smaller than that of the clear aperture 20 in the first sheet 12. The label 46 identifies the signal mirror assembly 10 and gives basic instructions for proper use, as well as a warning against misuse.

To provide a convenient means for carrying the signal mirror assembly 10 and securing it to one's person, a looped lanyard cord 50 is attached at one corner of the assembly 10. Advantageously, the present invention provides a unique and improved manner of lanyard cord attachment that is superior to the well known prior art method. In the old manner of attachment, a hole is drilled through the entire mirror assembly from front to back through which the lanyard cord 50 is threaded and tied thereto. In addition to easily allowing the cord to become untied and the mirror lost, this prior art means of attachment exposes the internal mirror reflective material to external corrosive agents entering through the unsealed hole.

In the new method of attachment of the present invention shown in FIGS. 1 and 2, a hollow zig-zag passage 52 is drilled into one corner of the first clear sheet 12. The two ends of the lanyard cord loop 50 are inserted into the passage 52 and secured by knotting and melting the ends inside the first sheet 12. Advantageously, this manner of cord attachment securely retains the cord 50 to the mirror assembly 10 while preserving the integrity of the sandwich construction, and thereby preventing any internal contact with foreign corrosive agents.

With the lanyard cord 50 secured inside the first clear sheet 12, a layer of sealing material 54 is applied around the entire perimeter of the mirror assembly 10. Preferably, a synthetic rubber sealing material is used that protects the internal mirror reflective material 18 from contact with corrosive agents, while also providing durable and smooth outer edges for impact resistance and comfortable handling, as well as additional structural reinforcement for the laminated assembly, and protection of exposed foam in the buoyant version. An example of such a suitable sealant is Evans-St. Clair #45056.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A signal mirror assembly, comprising:

a first clear sheet having inner and outer faces;

a layer of mirror reflective material covering said inner face of said first sheet and leaving a clear aperture in the center of said first sheet, said aperture defining a sighting window;

a second clear sheet having substantially the same shape as said first sheet, said second sheet having an inner face in laminated engagement with said inner face of said first sheet, wherein said mirror reflective layer is sandwiched between said inner faces of said first and second sheets; and pliable reinforce engaging said first sheet to resist warping of said mirror assembly and allow reshaping of said assembly by back-bend correction to remove any previously induced warpage and prevent the warpage from returning fully.

2. The signal mirror assembly of claim 1, wherein the thickness of said first sheet is greater than the thickness of said second sheet.

3. The signal mirror assembly of claim 1, further including a sheet of double-sided adhesive bonding said inner faces of said first and second sheets, a retroreflector aligned with said clear aperture and having a shape corresponding to said aperture, said retroreflector including a viewfinding hole through its center, said adhesive sheet including a center hole substantially equal in size to said retroreflector.

4. The signal mirror assembly of claim 3, wherein said retroreflector is a wire screen, the thickness of said wire screen is substantially equal to the thickness of said adhesive sheet to allow said wire screen to rest substantially flush inside said adhesive sheet, said wire screen and said hole in said adhesive sheet having an area larger than the area of said car aperture.

5. The signal mirror assembly of claim 1, wherein said first and second sheets are substantially rectangular and include two horizontal sides and two vertical ends, said first sheet further including a groove extending along at least one of said horizontal sides, said reinforce located within said side groove and comprising a light-weight material having substantially soft-temper bending characteristics.

6. The signal mirror assembly of claim 5, wherein said reinforce is a rod substantially rigidly anchored at a midpoint portion of said side groove and substantially flexibly connected throughout the remaining portions of said side groove.

7. The signal mirror assembly of claim 6, wherein said rod has a rectangular cross-section and is fabricated from aluminum.

8. Thy signal mirror assembly of claim 5, wherein said, first sheet further includes a groove extending along at least one of said vertical ends, said reinforce located within said end groove.

9. The signal mirror assembly of claim 1, wherein said first and second sheets are fabricated from transparent plastic.

10. The signal mirror assembly of claim 1, further including a night reflective sheet secured to an outer face of said second sheet, said night reflective sheet including a center hole aligned with said clear aperture in said first sheet.

11. The signal mirror assembly of claim 1, wherein said first sheet includes a hollow passage extending into said sheet between said inner and outer faces, said assembly further including a lanyard cord having a portion attached inside said passage.

12. The signal mirror assembly of claim 1, further including at least one buoyant pad attached to an outer face of said second sheet, whereby said pad allows said assembly to float.

13. The signal mirror assembly of claim 1, further including sealing means applied around the entire perimeter of said assembly.

14. The signal mirror assembly, comprising:

a first clear sheet having inner and outer faces;

a layer of mirror reflective material covering said inner face of said first sheet and leaving a clear aperture in the center of said first sheet, said aperture defining a sighting window;

a retroreflector aligned with said clear aperture and having a shape corresponding to said aperture, said retroreflector including a viewfinding hole through its center;

a second clear sheet having substantially the same shape as said first sheet, said second sheet having an inner face in laminated engagement with said inner face of said first sheet, whereby said mirror reflective layer and retroflector are sandwiched between said inner faces of said first and second sheets; and a clear center sighting disk positioned within said viewfinding hole in said retroreflector, said disk having opposing surfaces transparently adhering to said first sheet adjacent said clear aperture and to said inner face of said second sheet, wherein the sighting disk eliminates the possibility of condensation between said first and second sheets and provides structural reinforcement at the center of said assembly.

15. The signal mirror assembly of claim 14, wherein said sighting disk is plastic.

16. The signal mirror assembly of claim 15, wherein said retroreflector is a wire screen.

* * * * *

UNITED STATES PATENT AND TRADEMARK OFFICE
CERTIFICATE OF CORRECTION

PATENT NO. : 5,777,810
DATED : July 7, 1998
INVENTOR(S) : Malcolm G. Murray, Jr.

It is certified that error appears in the above-identified patent and that said Letters Patent is hereby corrected as shown below:

Col. 9, line 5
 replace "reinforce"
 with --reinforcer--.

Col. 9, line 26
 replace "car"
 with --clear--.

Col. 9, line 31
 replace "reinforce"
 with --reinforcer--.

Col. 9, line 35
 replace "reinforce"
 with --reinforcer--.

Col. 9, line 42
 replace "Thy"
 with --The--.

Col. 9, line 44
 replace "reinforce"
 with --reinforcer--.

Signed and Sealed this

Thirteenth Day of October 1998

Attest:

BRUCE LEHMAN

*Attesting Officer*               *Commissioner of Patents and Trademarks*